April 19, 1966   J. H. HINKLE, JR   3,246,977
TREATMENT OF WASTE GASES
Filed Aug. 2, 1962
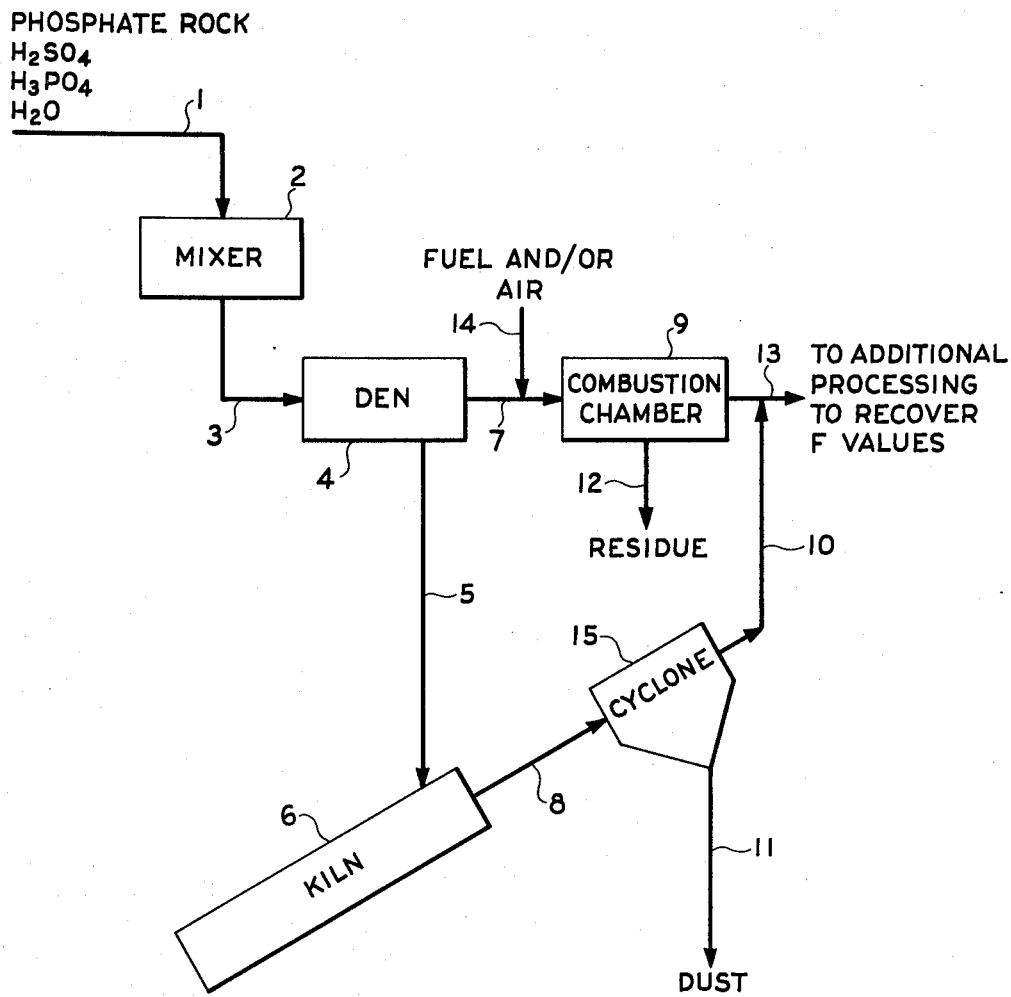

United States Patent Office 3,246,977
Patented Apr. 19, 1966

3,246,977
TREATMENT OF WASTE GASES
John H. Hinkle, Jr., Houston, Tex., assignor to Hooker Chemical Corporation, Niagara Falls, N.Y., a corporation of New York
Filed Aug. 2, 1962, Ser. No. 214,287
7 Claims. (Cl. 71—40)

This invention relates to the treatment of gaseous effluents from the processing of fluorine and silicon-containing materials, which gaseous effluents contain significant amounts of fluorine and silicon values, and more particularly relates to the treatment of the off gases obtained in the processing of phosphorus ores with acids.

In plants for the processing of materials, such as ores, which have a substantial fluorine content, generally, at least some of the fluorine will be given off in gaseous form, as waste stack gases or the like. For example, in processes for the acidulation and/or calcination of phosphate rock, silicon and fluorine values, generally in gaseous form, as well as other gases such as nitrogen, oxygen, carbon monoxide, carbon dioxide, water vapor, and, possibly sulfur dioxide are evolved. Where the phosphate rock has been admixed with sulfuric acid to aid in the defluorination, the $SO_2$ content of the off gases will generally be significant. In addition to these gaseous components, gas streams from such a process generally also contain entrained, finely-divided solids or dust. This dust is made up principally of silica, phosphate rock and acidulated rock products.

Before gases containing the above components can be released to the atmosphere, the gas must be treated so as to render innocuous the toxic contaminants therein. Inasmuch as the treatment of these gases so as to make them suitable for release to the atmosphere is, of necessity, an expensive process, it is very desirable if the phosphate rock dust, fluorine compounds, and sulfur compounds can be recovered during the treating steps. In this manner, if these compounds are recovered in a usable or salable form, a significant reduction in the overall expense of disposing of the gas is obtained.

Heretofore, numerous processes have been proposed for the treatment of such gas streams so as to recover the valuable constituents contained therein, and particularly the fluorine values, in usable or salable form. Of these processes, perhaps the most economically desirable are those in which the fluorine values are recovered as hydrogen fluoride. Exemplary of a particularly advantageous process of this type is that described in a copending application Ser. No. 197,079, filed May 23, 1962. In this process, the waste gases resulting from the acidulation and/or calcination of the phosphatic mineral are treated so as to adjust the temperature, total water concentration and total fluorine concentration of the gas and obtain an HF to $SiF_4$ ratio in the gas of at least 5:1. Thereafter, the suspended solid impurities in the gas are removed and the fluorine values separated from the silicon values by scrubbing the gas stream with an aqueous solution. The resulting solution of hydrofluoric acid may then be treated in any one of a number of ways so as to obtain a substantially anhydrous hydrogen fluoride gas.

Generally, for reasons of economy, the acidulation of the phosphatic minerals which produces the waste gases treated in accordance with the above process is carried out using a spent sulfuric acid from petroleum refining operations, which acid is commonly referred to as "alkylation acid." This spent sulfuric acid contains appreciable quantities of organic materials which contaminate the waste gases evolved during the acidulation or calcination process. Because of the malodorous nature of these organic constituents, it is essential that they be removed from the gas before any subsequent treatment thereof for recovery of the fluorine values, as well as other valuable constituents, is attempted. In removing these constituents, however, it is very desirable that the characteristics of the gas stream are not altered in some way that would be detrimental to the subsequent processing steps. It would, of course, be preferable if this treatment not only removed the malodorous organic constituents but also resulted in improving the condition of the gas for the subsequent processing steps.

It is, therefore, an object of the present invention to provide a process for the treatment of a gas containing fluorine values and silicon values wherein any malodorous organic substituents also contained in the gas will be removed.

Another object of the present invention is to provide a process for removing malodorous organic substituents from a gas, as has been set forth hereinabove, which process does not detrimentally effect the characteristics of the gas insofar as the recovery of the fluorine values therefrom is concerned.

A further object of the present invention is to provide a process as has been set forth hereinabove wherein not only are the malodorous organic substituents removed from the gas, but, additionally, the gas is put into a better condition for the recovery of the fluorine values by subsequent processing steps.

These and other objects will become apparent to those skilled in the art from the description of the invention which follows.

The drawing which is attached hereto and forms a part hereof, is a schematic flow-diagram of one embodiment of the process of the present invention.

The process of the present invention envisions combining an oxygen-containing gas with a gas containing fluorine values, silicon values and organic impurities, generally malodorous organic impurities, heating the combined gas mixture to a temperature sufficient to effect combustion of the organic impurities in the gas, regulating the flame temperature so there is incomplete combustion of the organic impurities while effecting a complete destruction of the malodors, effecting formation of a carbonaceous residue as a result of said incomplete combustion, said residue containing at least a portion of the silicon values originally present in the gas, and removing the thus formed residue from the gas.

It has been found that when operating in accordance with the present invention, the malodorous impurities in the gas are destroyed by combustion so that the gas is in condition for subsequent treating steps to recover the fluorine values contained therein. Additionally, by removing at least a portion of the silicon values originally present in the gas as a part of the carbonaceous residue formed, the subsequent treating steps to recover the fluorine values are made easier. Moreover, the heat applied to the gas in effecting the combustion of the organic impurities is beneficial in that it causes the chemical reaction: $SiF_4+2H_2O\rightarrow 4HF+SiO_2$ to take place in the gas mixture and go substantially to completion. In this manner, the fluorine values in the gas are put into a form, i.e., HF, in which they are most desirably recovered from the gas. Similarly, the silicon values are placed in a form, i.e., solid SiO₂, in which they are most easily removed from the gas stream, either as a part of a carbonaceous residue formed during the combustion of the organic impurities or in a subsequent removal step. Accordingly, by means of the present process, the malodorous organic impurities in the gas stream are destroyed and the characteristics of the gas are beneficially altered for subsequent processing steps.

As has been set forth hereinabove, the gases treated in accordance with the present invention contain fluorine values, silicon values, and organic impurities. Such gases may result from various manufacturing processes, as for example, aluminum ore refining processes, processes for the acidulation and/or calcination of phosphatic minerals. It has been found that the subject process may advantageously be used in conjunction with processes involving the acidulation and/or calcination of phosphatic minerals. Accordingly, for a purpose of illustrating the present invention reference will be made hereinafter to the treatment of gases obtained from such processes. This, however, is to be taken as being exemplary of this present process and not as a limitation thereof.

Such gases will usually contain sulfur dioxide ($SO_2$), silicon tetrafluoride ($SiF_4$), fluosilicic acid ($H_2SiF_6$), hydrogen fluoride (HF), steam ($H_2O$), carbon dioxide ($CO_2$), air, possible trace amounts of carbon monoxide (CO) and sulfur trioxide ($SO_3$) as well as other volatile materials such as gaseous organic compounds. Where alkylation sulfuric acid has been used in the acidulation of the phosphatic minerals, the quantities of the organic compounds in the off gases from the acidulation reaction will be appreciable. In addition to the above gaseous components, solid materials in suspension will also generally be present. Such materials include calcium phosphates in various forms such as tricalcium phosphate, dicalcium phosphate, monocalcium phosphate, and, perhaps, such materials such as pyro- and meta-phosphates. Additionally, silicon dioxide ($SiO_2$), as well as other silicon bearing materials will generally also be present. By means of the process of the present invention, the malodorous organic compounds contained in this gas are destroyed. Additionally, the heat which is supplied to the gas to effect the destruction of these materials causes the chemical reaction; $SiF_4 + H_2O \rightarrow 4HF + SiO_2$ to go substantially to completion. In this manner, not only is the destruction of the objectionable organic constituents in the gas achieved, but the fluorine and silicon values in the gas are substantially all put into a form which greatly simplifies their subsequent removal and recovery.

Preferably, in the practice of the present method, the destruction of the malodorous organic components is achieved by passing the gas stream containing these materials into a combustion chamber. Any suitable type of combustion chamber or apparatus may be used, it being understood that such chamber includes means for heating the gas to such a temperature as will effect combustion of the organic substituents in the gas. Preferably, the gas being treated is combined with an oxygen-containing gas in a flame which is directed into a combustion chamber. Additional fuel, such as natural gas or the like, may also be combined with the gas being treated and the oxygen-containing gas, where this is necessary to maintain a flame which is sufficient to destroy the malodorous organic materials in the gas. Generally, the introduction of additional fuel will be required only when the amount of the organic constitutents in the gas being treated is not sufficient to provide the temperature conditions required in the combustion chamber to effect the reaction set forth hereinabove. The amount of oxygen-containing gas which is combined with the gas being treated is limited so that the combustion, within the combustion chamber, is not complete and a carbonaceous residue is left, i.e., the oxygen is combined with the organic in less than the stoichiometric based on the combustible organic. This residue is in the form of a dust of sufficient particle size so as to settle, in a large proportion, to the bottom of the combustion chamber. From here, this dust is easily removed and discarded. This carbonaceous residue contains substantially all of the siliceous residue which is obtained from the decomposition of the fluorine compounds to form HF.

It has been found that where the supply of oxygen-containing gas combined with the gas under treatment is sufficient to give a hot flame and substantially complete combustion, the siliceous dust formed by the decomposition of the fluorine compounds is extremely fine and is substantially all entrained in the exit gases from the combustion chamber. This very fine dust then passes into the rest of the recovery system wherein it fouls up the ducts and, in general, adds to the difficulty of the subsequent processing of the gas. When operating in accordance with the method of the present invention, wherein the flame temperature is regulated to give incomplete combustion of the organic constituents in the gas, these difficulties are greatly reduced.

It is, of course, obvious to those skilled in the art that the combustion chamber used may be of either direct-fired type or an indirect-fired type, wherein the products of the fuel combustion are not commingled with the treated gases. Generally, excellent results have been obtained when the combustion chamber is of the direct-fired type. Where, however, dilution of the treated gases is disadvantageous, it will, of course, be preferred to use the indirect-fired type of combustion chamber.

With regard to the fuel which may be combined with the gas under treatment and the oxygen-containing gas, numerous gaseous, liquid and/or solid fuels may be used. For example, fuel gas, such as natural gas, fuel oil, pulverized coal, fuel oil containing pulverized coal, or the like, may be combined with the gas under treatment as is required. Additionally, with regard to the oxygen-containing gas, it is obvious that oxygen, itself, can be used. Generally, for reasons of economy, the preferred oxygen-containing gas for use in the present method is air.

The temperatures utilized in the combustion chamber will be sufficient to cause the destruction of the organic constituents in the gas and cause the hydrolysis of silicon tetrafluoride to proceed rapidly and substantially to completion. Generally, the minimum temperature used will be the lowest temperature which will provide a flame for the burning of the organic constituents. Similarly, the maximum temperature which can be used will be that at which the destruction of these organic constituents results in the formation of hydrogen and carbon monoxide, rather than water and carbon. Generally, the temperatures used in the present process will be within the range of about 800° F. to about 3000° F. Within this range, temperatures of about 1500° F. have been found to be effective and for this reason, such temperatures are specifically preferred.

It is to be noted that in the present process, the major portion of the fuel, i.e., the organic constituents in the gas being treated, are intimately admixed with the silicon and fluorine values in the gas. In this manner, intimate contact with the flame and heating efficiency of the highest order are obtained in a simple manner. As has been noted hereinabove, any additional fuel required to obtain the desired temperature in the combustion chamber is preferably admixed with the gas under treatment prior to its introduction into the combustion chamber. Similarly, the amount of air which will result in an incomplete combustion of the organic constituents present in the gas is also preferably admixed prior to introducing the gas into the combustion chamber. The precise amount of air or similar oxygen-containing gas which will be combined with the gas under treatment will, of course, vary according to the amount of organic materials present in the gas. Accordingly, no precise amount of oxygen-containing gas can be set forth. It is believed, however, that those skilled in the art will readily be able to determine, in each instance, the amount of oxygen-containing gas required. Generally, this determination can be made merely by observing the characteristics of the flame in the combustion chamber. For the purposes of the present invention, the flame used should be a so-called "smokey" flame, thus indicating that there is incomplete combustion of the organic constituents.

Considering now the drawing, there is illustrated a portion of a typical phosphate rock acidulation process with which the method of the present invention is combined. As is shown in the drawing, phosphate rock, sulfuric acid, phosphoric acid and water are introduced through a conduit 1 into a mixer 2, in which they are intimately mixed for chemical reaction. From the mixer 2, the reaction mix is delivered by a conveyor or conduit 3 to a den 4. The den serves as a holding means for permitting completion of the reaction between the materials which are fed to the mixer. After substantial completion of the reaction in the den, the mixed material is fed through a conduit or conveyor 5 into a kiln 6. The kiln may be a direct-fired countercurrent rotary kiln, or any suitable substitute therefor. In the kiln, the material is dried and calcined to drive off water, sulfur compounds and any other volatile matter. Generally, the kiln is operated at a temperature between about 1900° F. and about 2600–2800° F.

The gases which result from the chemical reaction in the mixer and den are conveyed through a conduit 7 to a combustion chamber 9. Within the combustion chamber, the gases are burned to cause the chemical reaction; $SiF_4 + H_2O \rightarrow 4HF + SiO_2$ to go substantially to completion. Additionally, during the combustion of the gases in the combustion chamber, substantially all of the organic substituents in the gas are destroyed. Fuel and/or air are passed through a conduit 14 to be combined with the gases in the conduit 7 before they are introduced into the combustion chamber. The amount of fuel combined will be only that which is required to maintain a desired combustion temperature of about 1500° F. in the combustion chamber 9. Similarly, the amount of air which is added will be regulated so that the amount of oxygen present is insufficient to effect a complete combustion of the organic impurities in the gas.

Within the combustion chamber 9, as a result of the incomplete combustion of the hydrocarbon constituents in the gas, there is formed a carbonaceous residue, which residue contains a substantial amount of the silicon values, as a siliceous dust formed by the hydrolysis of the silicon tetrafluoride. This residue is removed from the bottom of the combustion chamber through the conduit 12 and may then be discarded. In this manner, the amount of solids which must be subsequently removed from the gas are greatly reduced, thus simplifying the additional processing steps.

The gases from the kiln 6 are passed through the conduit 8 into a cyclone 15 wherein a major amount of the solid material in the gas is removed and passed through the conduit 11. The gas stream then passes out of the cyclone through the conduit 10 and is combined with the gases from the combustion chamber into the conduit 13. This combined gas stream, which is substantially free of malodorous organic constituents and which contains the major portion of the fluorine values in the form of hydrogen fluoride is then subjected to additional processing so as to recover the fluorine values. For this purpose, any desired recovery process may be used. Exemplary of such a process which may advantageously be used with the present method is the one set forth in a copending application Ser. No. 197,078, filed May 23, 1962, as indicated hereinabove.

By operating in the above manner, utilizing an amount of oxygen-containing gas which is insufficient to provide for complete combustion of the organic constituents in the gas being treated, the hydrolysis of the silicon tetrafluoride in the gas is obtained. Additionally, the malodorous organic contaminants in the gas are removed and a substantial portion of the silica is also removed from the gas in a non-finely divided form so that entrainment of this material in the gas and subsequent contamination and clogging of the ducts is prevented. Moreover, in the present process these benefits are obtained in a very economical manner inasmuch as the organic constituents of the gas being treated furnish a major portion of the fuel requirements for the combined incineration-hydrolysis process.

While there have been described various embodiments of the invention, the methods described are not intended to be understood as limiting the scope of the invention as it is realized that changes there within are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for treating a fluorine-containing gas which comprises combining an oxygen-containing gas selected from the group consisting of oxygen, air and mixtures thereof, with a gas containing fluorine values, silicon values and combustible organic impurities, maintaining the oxygen content of the gas at less than the stoichiometric proportion of oxygen based on the combustible organic impurities, heating the combined gas mixture to a temperature within the range of about 800 degrees to 3,000 degrees Fahrenheit to effect combustion of the organic impurities in the gas, effecting formation of a carbonaceous residue as a result of the incomplete combustion, said residue containing at least a portion of the silicon values originally present in the gas, and removing the thus-formed residue from the gas.

2. The process of claim 1 wherein the oxygen-containing gas is air.

3. The process as claimed in claim 1 wherein a supplemental organic fuel is combined with the oxygen-containing gas and the gas containing fluorine values, silicon values, and organic impurities.

4. In a process for the acidulation and calcination of a phosphatic mineral wherein phosphate rock, sulfuric acid, phosphoric acid and water are admixed, the resulting mixture is aged in a den for a period of time sufficient to effect substantial completion of the reaction and the thus-reacted mixture is calcined, the improvement which comprises combining an oxygen-containing gas selected from the group consisting of oxygen, air and mixtures thereof with the gas produced in the den, which latter gas contains fluorine values, silicon values and combustible malodorous organic impurities, maintaining the oxygen content of the gas at less than the stoichiometric proportion of oxygen based on the combustible organic impurities, heating the combined gas mixture to a temperature within the range of about 800 degrees to 3,000 degrees Fahrenheit to effect the combustion of the organic impurities in the gas, effecting formation of a carbonaceous residue as a result of said incomplete combustion, said residue containing at least a portion of the silicon values originally present in the gas, removing the thus-formed residue from the gas and, thereafter subjecting the thus-obtained gas to additional processing to recover the fluorine values contained therein.

5. The process as claimed in claim 4 wherein the oxygen-containing gas is air and wherein a supplemental organic fuel is combined with the air and the gas produced in the den.

6. The process of claim 5 wherein the amount of supplemental organic fuel added is sufficient to provide a combustion temperature within the range of about 800 to 3,000 degrees Fahrenheit.

7. The process as claimed in claim 4 wherein after the removal of the carbonaceous residue from the gas and prior to the additional treatment thereof for the recovery of fluorine values, the gas resulting from the calcination of the original mixture from the den is combined therewith.

References Cited by the Examiner

UNITED STATES PATENTS

| | | | |
|---|---|---|---|
| 2,418,203 | 4/1947 | Stauffer | 71—40 |
| 2,753,253 | 7/1956 | Hollingsworth | 71—44 |
| 2,944,396 | 7/1960 | Barton et al. | 23—2 X |
| 2,976,141 | 3/1961 | Carothers et al. | 71—40 |
| 3,054,653 | 9/1962 | Barton et al. | 23—2 |
| 3,058,803 | 10/1962 | Hinkle et al. | 23—2 |
| 3,063,799 | 11/1962 | Hinkle | 23—2 |
| 3,110,562 | 11/1963 | Hinkle | 23—153 |

DONALL H. SYLVESTER, *Primary Examiner.*

ANTHONY SCIAMANNA, *Examiner.*